United States Patent
Sylvain (10) Patent No.: US 7,463,613 B2
(45) Date of Patent: Dec. 9, 2008

(54) METHOD AND SYSTEM ENABLING COMMUNICATIONS BETWEEN A SWITCHED TELEPHONE NETWORK AND A WIRELESS NETWORK

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 778 days.

(21) Appl. No.: 10/968,762

(22) Filed: Oct. 19, 2004

(65) Prior Publication Data

US 2005/0078663 A1      Apr. 14, 2005

Related U.S. Application Data

(63) Continuation of application No. 10/800,054, filed on Mar. 12, 2004, now Pat. No. 6,961,328, which is a continuation of application No. 09/543,328, filed on Apr. 5, 2000, now Pat. No. 6,724,801.

(51) Int. Cl.
| | |
|---|---|
| H04L 12/28 | (2006.01) |
| H04L 12/66 | (2006.01) |
| H04M 11/00 | (2006.01) |
| H04Q 7/20 | (2006.01) |

(52) U.S. Cl. .................. 370/338; 370/352; 370/395.52; 370/401; 379/88.17; 379/93.07; 455/433

(58) Field of Classification Search .................. 370/338, 370/352, 395.52, 401; 379/88.17, 93.07; 455/433

See application file for complete search history.

(56) References Cited

U.S. PATENT DOCUMENTS

5,434,854 A    7/1995  Focarile et al. ............. 370/60.1

(Continued)

FOREIGN PATENT DOCUMENTS

EP    0801513 A1    4/1997

(Continued)

OTHER PUBLICATIONS

Bora A. Akyol and Donald C. Cox. "Handling Mobility in a Wireless ATM Network", Stanford University, IEEE 1996.

Primary Examiner—Alpus H Hsu
(74) Attorney, Agent, or Firm—Withrow & Terranova, P.L.L.C.

(57) ABSTRACT

A method and system enables communications between a switched telephone network and a wireless network comprising a plurality of Mobile Switching Centers (MSCs). Each MSC is connected by respective interfaces to a broadband packet network used for the transfer of bearer traffic between the MSCs, and controls wireless communications with a respective plurality of wireless transceivers. The switched telephone network and the wireless network are interconnected by at least one media gateway for conveying bearer traffic between the switched telephone network and the broadband packet network. The system comprises a location register and a call manager. The location register is adapted to store, in respect of each wireless transceiver, information identifying a respective current MSC controlling communications with the wireless transceiver. The call manager is adapted to: query the location register to obtain the information identifying the current MSC respecting the selected wireless transceiver; and enable a communications path across the broadband packet network between an inbound media gateway and the current MSC. The advantages include simplified routing, congestion reduction and reduced cost of infrastructure to support a rapidly expanding wireless subscriber base.

124 Claims, 7 Drawing Sheets

U.S. PATENT DOCUMENTS

| | | | |
|---|---|---|---|
| 6,058,303 A * | 5/2000 | Åstrom et al. | 455/413 |
| 6,167,040 A * | 12/2000 | Haeggstrom | 370/352 |
| 6,282,194 B1 | 8/2001 | Cheesman et al. | 370/356 |
| 6,330,454 B1 | 12/2001 | Verdonk | 455/456 |
| 6,343,065 B1 * | 1/2002 | Serbest et al. | 370/230 |
| 6,353,607 B1 | 3/2002 | Valentine et al. | 370/349 |
| 6,370,385 B1 | 4/2002 | Bohm et al. | 455/450 |
| 6,487,412 B1 * | 11/2002 | Brennan et al. | 455/445 |
| 6,490,451 B1 | 12/2002 | Denman et al. | 455/436 |
| 6,496,691 B1 * | 12/2002 | Easley et al. | 455/415 |
| 6,553,227 B1 | 4/2003 | Ho et al. | 455/433 |
| 6,611,532 B1 | 8/2003 | Madour et al. | 370/466 |
| 6,697,422 B1 * | 2/2004 | Mathai | 375/222 |
| 6,757,285 B1 * | 6/2004 | Lakhani et al. | 370/395.2 |
| 6,795,708 B1 * | 9/2004 | Patel | 455/450 |
| 6,847,634 B1 * | 1/2005 | Pearce et al. | 370/352 |
| 7,085,260 B2 * | 8/2006 | Karaul et al. | 370/352 |
| 7,142,857 B1 * | 11/2006 | Calabrese et al. | 455/436 |
| 7,145,899 B1 * | 12/2006 | Pearce et al. | 370/352 |
| 7,227,837 B1 * | 6/2007 | Bi et al. | 370/217 |
| 7,342,917 B2 * | 3/2008 | Mohan et al. | 370/352 |
| 2002/0160812 A1 * | 10/2002 | Moshiri-Tafreshi et al. | 455/561 |
| 2002/0196781 A1 * | 12/2002 | Salovuori | 370/352 |

FOREIGN PATENT DOCUMENTS

EP      0989771 A2      9/1999

* cited by examiner

METHOD AND SYSTEM ENABLING COMMUNICATIONS BETWEEN A SWITCHED TELEPHONE NETWORK AND A WIRELESS NETWORK

CROSS-REFERENCE TO RELATED APPLICATIONS

The present application is a continuation of U.S. patent application Ser. No. 10/800,054, filed Mar. 12, 2004, pending, which is a continuation of U.S. patent application Ser. No. 09/543,328, filed Apr. 5, 2000, now issued as U.S. Pat. No. 6,724,802.

TECHNICAL FIELD

The present invention relates to wireless communications networks and, in particular, to a method and system for enabling communications between a switched telephone network and a wireless network.

BACKGROUND OF THE INVENTION

In recent years, there has been an exponential increase in demand for wireless communications services, which was initiated by the development of cellular telephones. Cellular telephones permit subscribers to initiate telephone calls to other mobile subscribers or fixed stations in the Public Switched Telephone Network (PSTN), or to receive calls from either of those sources. Typically, communications between a subscriber using a wireless transceiver and a called station, is mediated by a Mobile Switch Center (MSC), which functions as a Service Switching Point (SSP) in the PSTN. MSCs control wireless communications with each wireless transceiver operating within a service area covered by the MSC. In order to provide wireless communication services over a large geographic area, it is common to divide the coverage area of the wireless network into discrete service areas (cells) several of which are collectively served by a respective MSC. MSCs operated by a wireless communications service provider are commonly interconnected by time division multiplexed (TDM) trunk facilities. Each subscriber of wireless telecommunications services is assigned a telephone number by the service provider associated with one of the MSCs. That MSC serves as a home MSC for the subscriber. The address (telephone number) of the subscriber's wireless transceiver is recorded in a home location register (HLR) maintained by the home MSC. Calls directed to the subscriber's address are routed using translation tables in the PSTN to the home MSC.

In order to enhance mobility of the subscriber, the HLR also contains information identifying a current location of the subscriber's wireless transceiver. As the subscriber roams from one cell to another, control of wireless communications with the wireless transceiver is transferred to the MSC serving the cell within which the wireless transceiver is located. The address of the "current MSC" is recorded in the HLR maintained by the home MSC of the wireless transceiver as the current location of the wireless transceiver. With this arrangement, an inbound call destined for a subscriber's wireless transceiver is automatically routed to the home MSC. Upon receipt of the call set-up messages, the home MSC queries its HLR to obtain the current location of the wireless transceiver, and then routes the inbound call to the current MSC, if it is different from the home MSC, in order to complete the call.

This conventional arrangement has a disadvantage in that, as the number of subscribers increases, substantial resources of each MSC become tied-up routing inbound calls to other MSCs to serve roaming subscribers. Additionally, as the number of MSCs increases, the size and complexity of the trunk facilities required to handle the inter-MSC traffic also increases.

In order to address these issues, it is known to designate one of the MSCs as a "Gateway MSC", and route all inbound calls to wireless subscribers through the Gateway MSC. The Gateway MSC uses the call set-up messages for the inbound call to identify the home MSC, and queries the HLR maintained by the home MSC to obtain the current location of the called wireless transceiver. The Gateway MSC can then route the inbound call to the current MSC, bypassing the home MSC if the subscriber is roaming, so that the inbound call can be completed without requiring resources of the home MSC. This solution helps to reduce congestion in the mobile network. However, it also tends to increase the size and complexity of the interoffice trunking network because each MSC must be connected to a Gateway MSC in addition to being interconnected with the other MSCs. In addition, since all inbound traffic is routed through the Gateway MSC, congestion of trunks associated with the Gateway MSC is also increased as demand for wireless communications services grows.

Co-pending and co-assigned U.S. patent application Ser. No. 09/158,855, filed Sep. 23, 1998 and entitled TRANSIT TRUNK SUBNETWORK SYSTEM teaches the connection of SSPs to a broadband packet network (e.g. an Asynchronous Transfer Mode (ATM) or Internet Protocol (IP) backbone) which provides dynamic trunking between the SSPs over Switched Virtual Circuits (SVCs) set up through the broadband packet network. The application also teaches that the broadband packet network can be used for trunking between MSCs of a wireless network, thus providing a means of dramatically simplifying inter-MSC trunking by replacing interoffice TDM trunks with broadband packet network facilities. However, this solution relies on a Gateway MSC through which inbound calls are routed in order to enable identification of home MSCs and querying of the associated HLRs to determine a current location of called wireless subscribers. The Gateway MSC therefore becomes a bottleneck to traffic handling as the number of mobile subscribers increases. Alternatively, the Gateway MSC functionality may be distributed among the MSCs in the wireless network. However, this solution has a disadvantage in that the Gateway MSC functionality must be installed and maintained in each of the distributed Gateway MSCs. This contributes to operating overhead and capital expense.

Accordingly, there exists a need for a low cost and highly scalable means for enabling communications between wireline and wireless subscribers.

SUMMARY OF THE INVENTION

An object of the present invention is to provide a method and system for enabling communications between a switched telephone network and a wireless telephone network in which inbound calls can be routed to the wireless network through any one of a plurality of gateways.

A further object of the present invention is to provide a method and system for enabling communications between a switched telephone network and a wireless network, in which an inbound call entering the wireless network through an inbound gateway is trunked through a broadband packet network and an outbound gateway to a specific MSC controlling wireless communications with a destination wireless transceiver.

Accordingly, the present invention provides a system for enabling communications between a switched telephone network and a wireless network comprising a plurality of Mobile Switching Centers (MSCs). Each MSC is connected by respective gateways to a broadband packet network used for the transfer of bearer traffic between the MSCs, and controls wireless communications with a respective plurality of wireless transceivers (cellular phones, personal computer with wireless communication capability, etc). The switched telephone network is interconnected by at least one gateway to the broadband packet network for conveying bearer traffic between the wireline network and the broadband packet network. The system comprises a location register and a call manager. The location register is adapted to store, in respect of each wireless transceiver, information identifying the MSC currently controlling communications with the wireless transceiver. The call manager is adapted to query the location register to retrieve the information identifying the MSC currently serving a selected wireless transceiver. The call manager enables a communications path across the broadband packet network between a selected gateway and the MSC.

The invention also provides a method of enabling communications between a switched telephone network and a wireless telephone network comprising a plurality of mobile switching centers (MSCs). Each MSC is connected by respective gateways to a broadband packet network used for the transfer of bearer traffic between the MSCs, and each MSC controls wireless communications with a respective plurality of wireless transceivers. The switched telephone network is interconnected by at least one gateway to the broadband packet network for conveying bearer traffic between the switched telephone network and the broadband packet network. The method comprises a first step of providing a location register for storing, in respect of each wireless transceiver, information identifying an MSC serving each wireless transceiver at the time of a query. In a second step, the location register is queried to obtain the information identifying the MSC serving a selected wireless transceiver. In a third step, a communications path is enabled across the broadband packet network between a selected gateway interfacing the switched telephone network and a selected gateway interfacing the MSC serving the selected transceiver.

The location register may comprise a centralized home location register (HLR) containing information identifying a respective MSC serving each wireless transceiver in the wireless network. The location register may be co-resident with the call manager, or remote from the call manager. The call manager may be adapted to query the location register via a Common Channel Signaling (CCS) network or via the broadband packet network.

Alternatively, the location register may comprise a plurality of Home Location Registers (HLRs), each HLR being associated with a respective home MSC and containing information respecting predetermined ones of the wireless transceivers. In this case, the call manager is preferably adapted to: select one of the plurality of HLRs; and query the selected HLR via one or more of the broadband packet network and a Common Channel Signaling (CCS) network. Selection of the HLR can be based on information identifying the selected wireless transceiver.

Preferably, the call manager is connected to a common channel signaling (CCS) network and is assigned a point code to enable call setup messages to be addressed to the call manager for setting up communications paths across the broadband packet network.

For an inbound call to a selected wireless transceiver, the call manager is preferably responsive to call setup messages to set up a communications path across the broadband packet network between an inbound gateway interfacing the switched telephone network and an outbound gateways interfacing the MSC serving the selected wireless transceiver. The call setup messages may be conventional Integrated Services Digital Network User Port (ISUP) messages including information identifying the selected wireless transceiver. The call manager is preferably adapted to query the location register, using the information identifying the selected wireless transceiver, to obtain information identifying the MSC currently serving the selected wireless transceiver. The call manager may be further adapted to send a call set-up message including information identifying the selected wireless transceiver to the serving MSC to enable completion of the call to the selected wireless transceiver, and to send connection request messages to the inbound gateway and the outbound gateway to set up a communications path across the broadband packet network between the inbound gateway and the outbound gateway.

For an outbound call originating from a wireless transceiver, the call manager is preferably responsive to call setup messages to set up a communications path across the broadband packet network between the gateway interfacing the MSC serving of the selected wireless transceiver and an outbound gateway interfacing the switched telephone network. The call setup messages are preferably ISUP messages including information identifying the MSC serving the wireless transceiver, and a destination address on the switched telephone network. The call manager may be further adapted to select one of the plurality of gateways as the outbound gateway and send connection request messages to the outbound gateway and the gateway interfacing the MSC to set up a communications path across the broadband packet network between the gateway interfacing the MSC and the outbound gateway. Thereafter, the call manager sends a call set-up message over the CCS network to the switched telephone network, to set up a connection across the switched telephone network between the outbound gateway and the destination address.

Selection of the outbound gateway may be made on a basis of geographical proximity to the destination address in the switched telephone network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
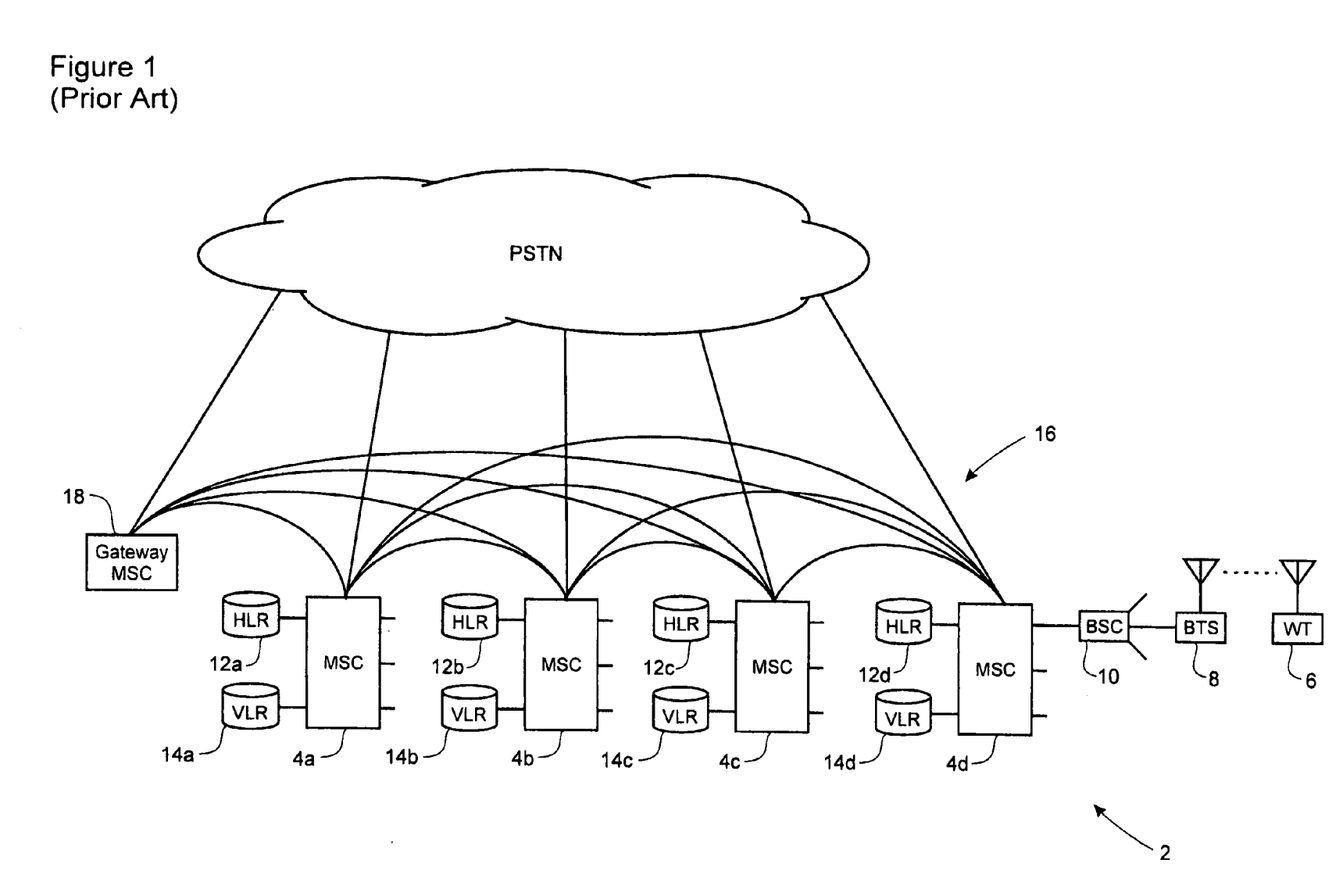
FIG. 1 is a schematic diagram illustrating a prior art configuration of a wireless communications network in which traffic inbound from the Public Switched Telephone Network (PSTN) is routed through a Gateway MSC.

The present invention provides a means of enabling communications between a switched telephone network (e.g. the PSTN) and a wireless communications network. Wireless communications services are currently provided by a number of competing service providers, each of which maintains a respective wireless network providing wireless communications services within a coverage area. As shown in FIG. 1, the wireless network 2 typically includes a plurality of mobile switch centers (MSCs) 4a-d (four of which are shown in FIG. 1) which are well known in the art. Each MSC 4a-4d controls wireless communications for wireless transceivers 6 (only one of which is shown in FIG. 1) within a respective service area, typically via one or more Base Transceiver Stations (BTS) 8 and, possibly, one or more Base Station Controllers (BSC) 10. In general, each MSC 4 is capable of controlling a plurality of BSCs 10, each of which is capable of controlling a respective plurality of BTSs 8. However, for ease of illustration, only one base station controller 10 and one base transceiver station 8 are shown.

Each subscriber has a Wireless Transceiver (WT) 6, for example a cellular telephone or a personal communications system (PCS), to facilitate wireless communications. Each wireless transceiver 6 is assigned by the communications service provider to a home MSC which maintains a record related to the wireless transceiver in a home location register (HLR) 12a-d.

As the subscriber roams within the coverage area of the wireless network 2, the wireless transceiver 6 may leave the service area of the home MSC 4 and enter the service area of another MSC 4 in the network 2. When this occurs, its record in the HLR 12 is dynamically updated with information concerning the location of the wireless transceiver 6. Typically, this information is an address of an MSC 4 serving the wireless transceiver, which is an MSC 4 that controls the service area within which the wireless transceiver 6 is located. As is known in the art, each MSC also maintains a Visitor Location Register (VLR) 14a-d in which it records information identifying roaming wireless transceivers that are currently within the service area that the MSC controls.

For example, in the arrangement illustrated in FIG. 1, the wireless transceiver 6 may be assigned to MSC 4a as its home MSC. However, the wireless transceiver 6 has roamed into the service area of MSC 4d, and thus the address of MSC 4d will be entered in the HLR 12a as the location of the wireless transceiver 6.

Trunking of inter-MSC traffic is typically accomplished by means of a complex mesh of interoffice trunks 16 that interconnect each of the MSCs 4a-d to each of the other MSCs 4a-4d. In order to reduce resource demand on each of the MSCs 4a-d, a gateway MSC 18 can be provided to handle inbound calls originating in the PSTN and destined for wireless transceivers. Thus, for example, an inbound call destined for a selected wireless transceiver 6, is routed through the PSTN to the Gateway MSC 18. Upon receipt of a call set-up message (e.g. a conventional ISUP IAM message), the Gateway MSC 18 uses information in the call set-up message to find the address of the home MSC 4a of the wireless transceiver 6. The Gateway MSC 18 then queries the HLR 12a maintained by the home MSC 4a (e.g. by means of a conventional query message to the home MSC 14a) in order to obtain information identifying the location of the wireless transceiver 6 (e.g. in this case the address of the MSC 4d). Based on the information identifying the location of the wireless transceiver, the Gateway MSC then routes the inbound call to the current MSC 4d for termination in a conventional manner using the interoffice trunks 16 that interconnect the MSCs 4a-d.

Each MSC 4a-d is configured as a Service Switching Point (SSP) in the PSTN. Thus, an outbound call originating at a wireless transceiver 6 and destined for a termination in the PSTN can be routed directly from the MSC 4d to the PSTN.

Alternatively, the Gateway MSC functionality can be distributed among the MSCs 4a-4d so that an inbound call destined for a selected wireless transceiver 6, is routed through the PSTN to a predetermined one of the Gateway MSCs 4a-d based on, for example, the home address of the wireless transceiver. Upon receipt of the call set-up message, the distributed Gateway MSC 4a, for example, uses information in the call set-up message to find the address of the home MSC 4d, for example, of the wireless transceiver 6. The distributed Gateway MSC 4a then queries the HLR 12d maintained by the home MSC 4d in order to obtain information identifying the location of the wireless transceiver 6. In this example, the wireless transceiver is in an area served by the home MSC 4d. Based on the information identifying the location of the wireless transceiver, the distributed Gateway MSC 4a then routes the inbound call to the home MSC 4d for termination in a conventional manner.

Figure 2:
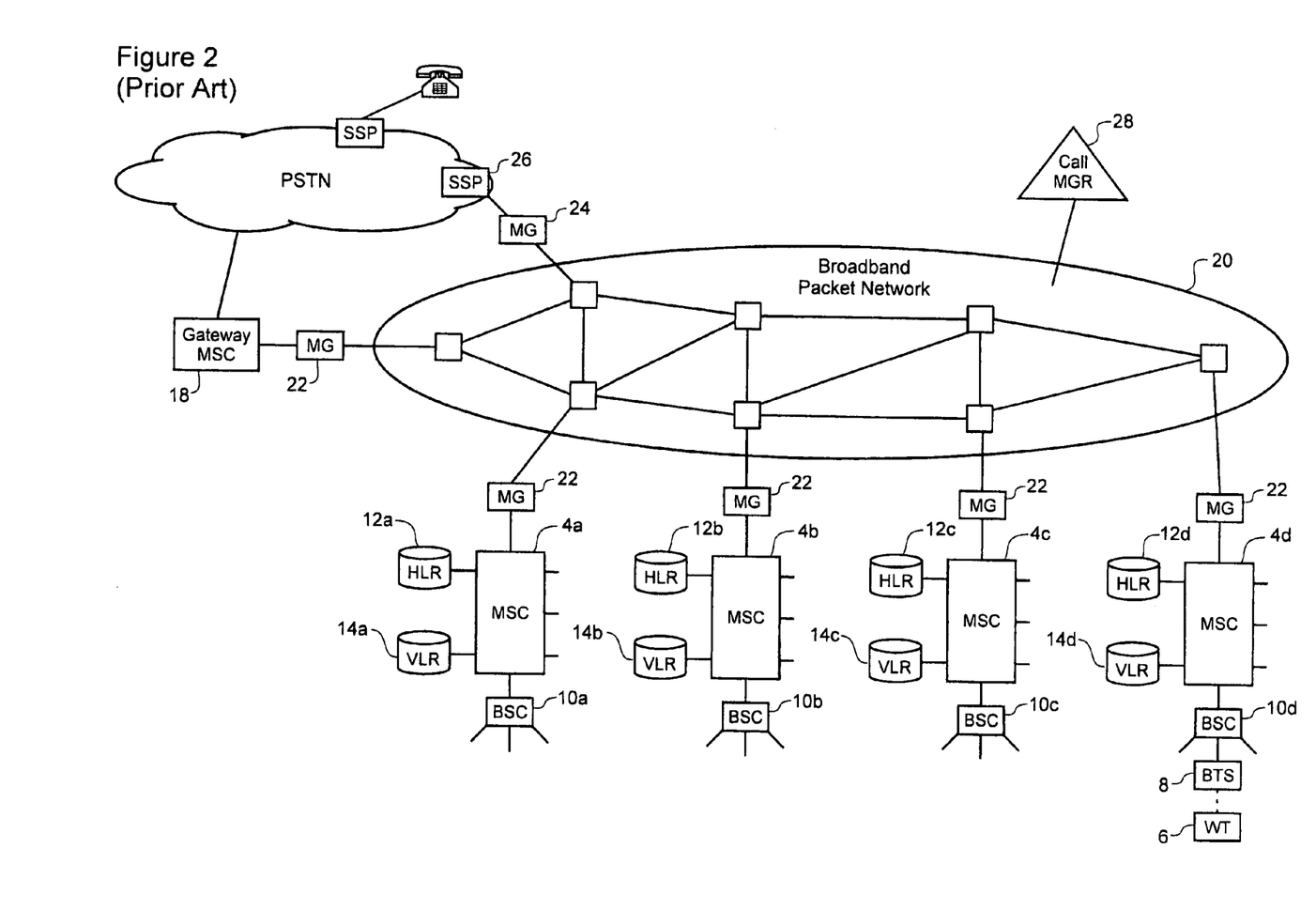
FIG. 2 is a schematic diagram illustrating another prior art configuration of a wireless communications network in which time division multiplexed (TDM) trunking shown in FIG. 1 has been replaced by a broadband packet network.

As shown in FIG. 2, inter-MSC trunking has been dramatically simplified by replacing the interoffice trunks 16 with a broadband packet network 20 as described in the co-assigned U.S. patent application Ser. No. 09/158,855. For this purpose, each of the MSCs 4a-d, as well as the Gateway MSC 18, are provided with an interface 22 (e.g. a media gateway (MG)) for converting Time-Division Multiplexed (TDM) Pulse Code Modulated (PCM) signals of the PSTN to a data format of the broadband packet network. One or more additional MGs 24 may also be provided to interconnect additional SSPs 26 of the PSTN to the broadband packet network 20 in order to carry outbound traffic originating from wireless transceivers 6 and destined for the PSTN.

Inbound calls are routed to the Gateway MSC 18 which determines the address of the home MSC 4a of the called wireless transceiver 6 and queries the associated HLR 12a, as described above with respect to FIG. 1. The inbound call is then routed to the current MSC 4d via a switched virtual connection (SVC) set-up through the broadband packet network 20 by a call manager 28. The detailed inter-workings of the MGs 22 and the interaction between the Gateway MSC 18, the call manager 28, and the MSC 4d to enable routing of signals through the broadband packet network 20 are described in detail in U.S. patent application Ser. No. 09/158,855, and is therefore not described in detail.

Figure 3:
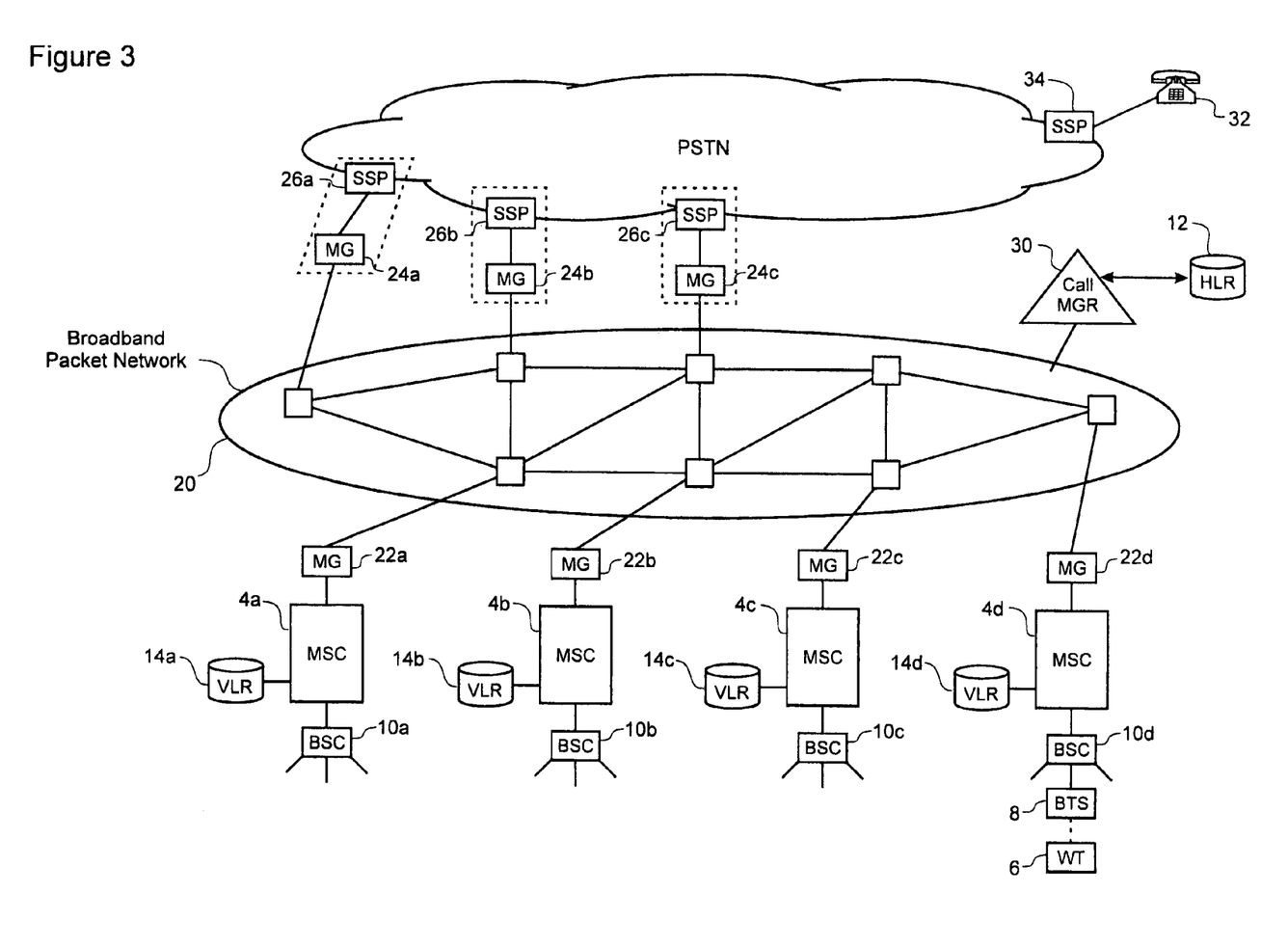
FIG. 3 is a schematic diagram of a system in accordance with a preferred embodiment of the present invention for enabling communications between a switched telephone network and a wireless network.

As shown in FIG. 3, the present invention provides an improved arrangement for enabling communications between the PSTN and the wireless network 2. In accordance with the present invention, the HLR functionality of the Gateway MSC 18 (FIGS. 1 and 2) is relocated to the call manager 30, thus rendering the Gateway MSC 18 redundant. Elimination of the Gateway MSC 18 enables inbound calls to be routed to the broadband packet network 20 through any SSP 26*a-c* of the PSTN provided with an MG 24*a-c* to the broadband packet network 20.

Since inbound and outbound calls may be routed through any of a plurality of MG connections (24*a*,26*a*-24*c*,26*c*), points of congestion in the PSTN are reduced and scalability of the wireless network 2 is enhanced. In the embodiment shown in FIG. 3, each of the MSCs 4*a-d*, as well as the associated base station controllers 10 and base transceiver stations 8, can be of a conventional design. Similarly, the content and functionality of the respective visitor location registers 14*a-d* maintained by each MSC 4*a-d* can be conventional. The home location register 12, which contains information identifying the location of each wireless transceiver 6 in the wireless network, may be distributed among the MSCs 4*a-d* in a conventional manner. If so, the call server will query the appropriate HLR based on the phone number of the mobile transceiver. Alternatively, the HLR 12 may be consolidated (as shown in FIG. 3) to facilitate access by the call manager 30. A consolidated HLR 12 can be co-resident with the call manager 30, or stored at a remote location and accessed by the call manager 30 through either the CCS network or the broadband packet network 20. The operation of the principle elements of the system shown in FIG. 3 is described below for inbound and outbound calls with reference to FIGS. 4*a-b* and 5*a-b*, respectively.

Figure 4A:
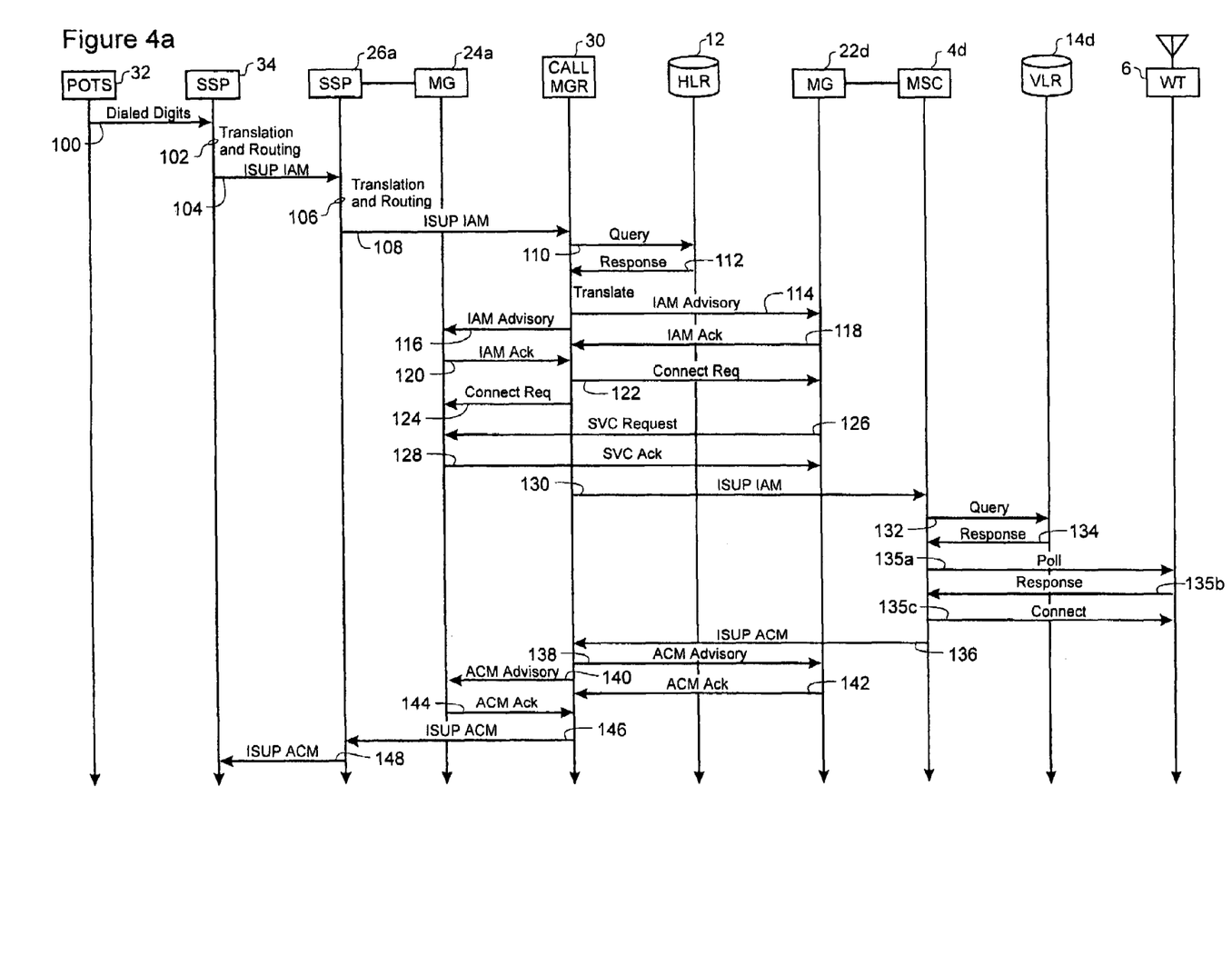
FIGS. 4a-b are message-flow diagrams schematically illustrating the principle messages exchanged between the components of the system shown in FIG. 3 for calls inbound from the PSTN to a wireless transceiver.
Figure 4B:
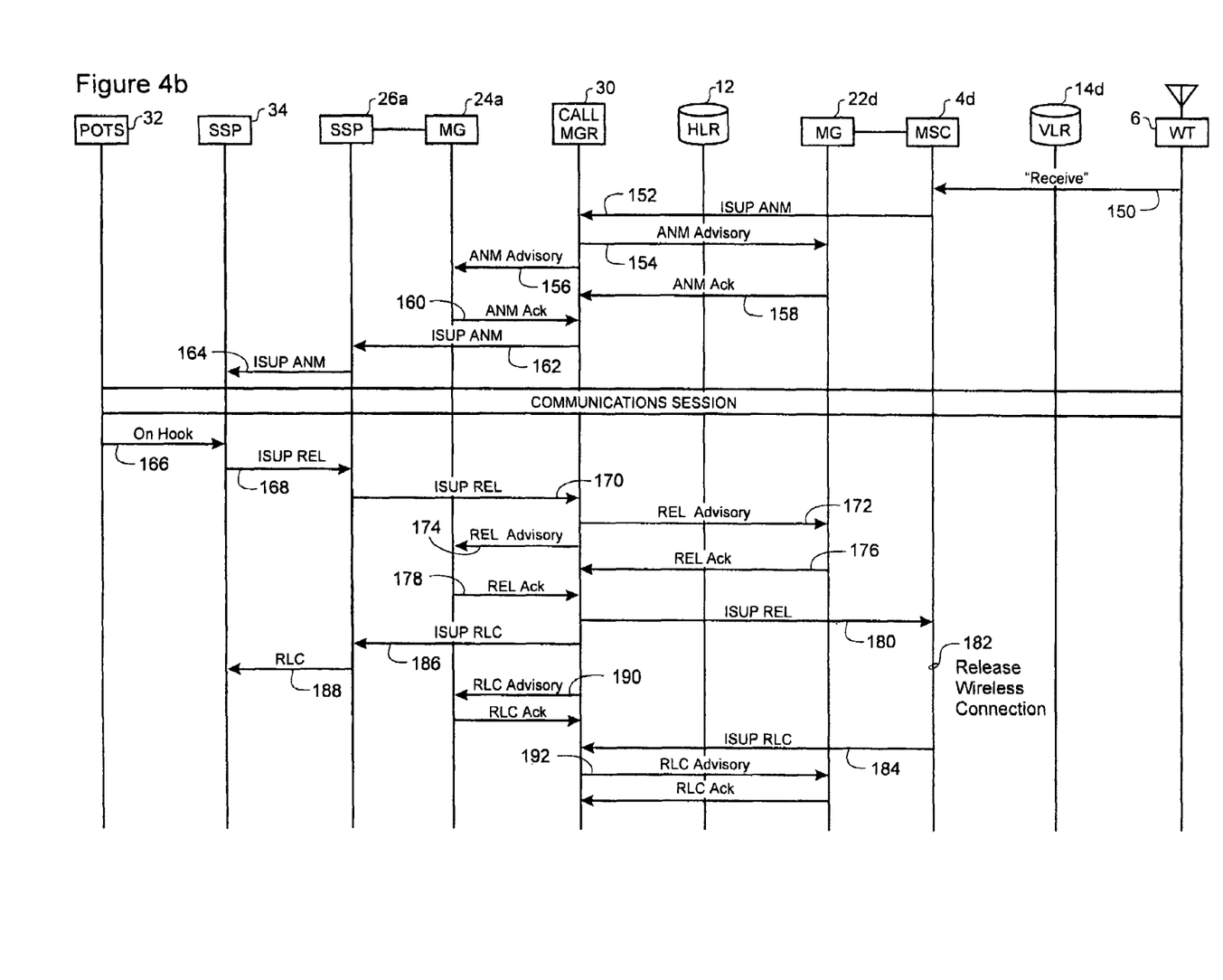

FIGS. 4*a-b* are schematic diagrams of the principal messages exchanged during the set-up and release of an inbound call connection to a wireless transceiver 6 from a telephone handset 32 connected to a caller served by SSP 34 in the PSTN. In step 100, the telephone handset 32 is operated by a user (not shown) to dial digits to initiate the call. The dialed digits are transmitted over a subscriber loop (not illustrated) to the SSP 34 in a manner well known in the art. On receipt of the dialed digits, the SSP 34 queries translation and routing tables (not shown) to determine how the call should be routed. The translation tables may be local translation tables or may require a query to a Service Control Point (SCP) not shown. After translation and routing (step 102), the SSP 34 determines that the call should be routed to an SSP 26*a* which can reach the mobile network via the broadband packet network 20. The SSP 34 therefore formulates an ISUP IAM and forwards it in step 104 to the inbound SSP 26*a*.

On receipt of the ISUP IAM, gateway SSP 26*a* queries translation and routing tables (not shown) to determine how the call should be routed (step 106). These translation and routing tables may also be local tables or may require a query to a Service Control Point (SCP) (not shown). On translation, the inbound SSP 26*a* determines that the call should be routed to a Point Code of the call manager 30 which acts as the entry point to get access to the MSC. As will be understood by those skilled in the art, there may be more than one call manager 30 associated with the broadband packet network 20, each call manager 30 being identified by a unique point code.

The gateway SSP 26*a* therefore formulates an ISUP IAM and forwards it in step 108 to the call manager 30. On receipt of the ISUP IAM, the call manager 30 translates the dialed number and queries the HLR 12 to obtain information respecting which of the MGCs 4*a*-4*b* is currently serving the mobile transceiver, in this example the MSC 4*d* (steps 110 and 112). The call manager 30 also determines an address (in the broadband packet network) of the MG 22*d* connecting to the MSC 4*d*. Consequently, the call manager formulates an IAM Advisory message which it forwards to the MG 22*d* (step 114). An IAM Advisory message is also formulated and sent to MG 24*a* via the broadband packet network in step 116. On receipt of the IAM Advisory messages, MGs 22*d*,24*a* return IAM Acknowledge messages in steps 118, 120, respectively. On receipt of the IAM Acknowledge messages, the call manager 30 formulates connection request messages which are forwarded to the respective MGs 22*d*,24*a* in steps 122 and 124. The IAM Advisory message sent in step 114 to MG 22*d* contained the broadband packet network address of MG 24*a*. Consequently, MG 22*d* is enabled to set up a connection (a Switched Virtual Circuit (SVC), for example), backwards through the broadband packet network to the MG 24*a*. This is initiated by sending a SVC request message in step 126. This message is processed by the various elements in the broadband backbone network 20 using methods which are well known to establish an end to end connection. Eventually the message 126 reaches the MG 24*a* which responds with a SVC acknowledge message in step 128 indicating that the connection has been set up. Again, message 128 is processed by the same elements in the broadband backbone network 20 using methods which are well known. Meanwhile, the call manager 30 formulates an ISUP IAM containing the dialed digits and forwards the ISUP IAM to the current MSC 4*d* in step 130. On receipt of the ISUP IAM, the MSC 4*d* may extract the dialed digits and query (step 132) its Visitor Location Register (VLR) 14*d* to determine whether the wireless transceiver 6 is in fact located within its service area. If the result of the query is affirmative, the VLR 14*d* returns an enabled signal in a response message (step 134). Otherwise, the MSC 4*d* returns an ISUP Release message (not shown) to the call manager 30 to end the inbound call connection request. In this example, an affirmative response is returned by the VLR 14*d* at step 134. Consequently, the MSC 4*d* sets-up a wireless connection (steps 135*a-e*) with the wireless transceiver 6 and then returns an Address Complete (ACM) ISUP message in step 136 to the call manager 30. On receipt of the ACM, the call manager 30 sends respective ACM Advisory messages to the MGs 22*d*, 24*a* in steps 138 and 140. These messages are acknowledged in steps 142 and 144. Meanwhile, the call manager 30 forwards the ACM message to the SSP 26*a* in step 148 which in turn forwards the ACM message to the SSP 34 in step 148, which connects the local loop that serves the telephone handset 32 to complete the circuit to the MSC 4*d*.

On successful completion of the wireless connection path with the wireless transceiver 6 (e.g. the subscriber presses a "receive" button of the wireless transceiver 6, at step 150), the MSC 4*d* formulates an ISUP Answer (ANM) message which it returns to the call manager 30 in step 152. On receipt of the ANM message, the call manager 30 sends ANM Advisory messages to the respective MGs 22*d*,24*a* in steps 154, 156 and receives Acknowledgements in steps 158, 160. The call manager 30 then forwards the ANM message to SSP 26*a* in step 162, which forwards the ANM message to the SSP 34 in step 164. On receipt of the ANM message, the SSP 34 may start a billing record for the call, if appropriate.

After the caller and subscriber have completed the communications session, the caller places their telephone handset 32 "on-hook" in step 166 (FIG. 4*b*). On receiving the on-hook signal, the SSP 34 formulates an ISUP Release (REL) message which it forwards to the SSP 26*a* (step 168), which in turn forwards the ISUP REL message to the call manager 30 in step 170. On receipt of the REL message, the call manager 30 sends REL Advisory messages and receives REL Acknowledge messages to the respective MGs 22*d*,24*a* (steps 172-178). The call manager 30 then sends the REL message on to the MSC 4*d* in step 180. On receipt of the REL message, the MSC 4*d* releases the wireless connection with the wireless transceiver 6 and performs subscriber billing functions, as required (step 182). The MSC 4*d* then formulates an ISUP Release Complete (RLC) message which it sends in step 184 to the call manager 30. Meanwhile, the call manager 30 has sent an RLC message in step 186 to the SSP 26a (which is forwarded to the SSP 34, in step 188) and an RLC Advisory message in step 190 to the MG 24a. On receipt of the RLC message in step 184 from the MSC 4d, the call manager 30 sends an RLC Advisory message in step 192 which completes release of resources used in the inbound call connection.

Figure 5A:
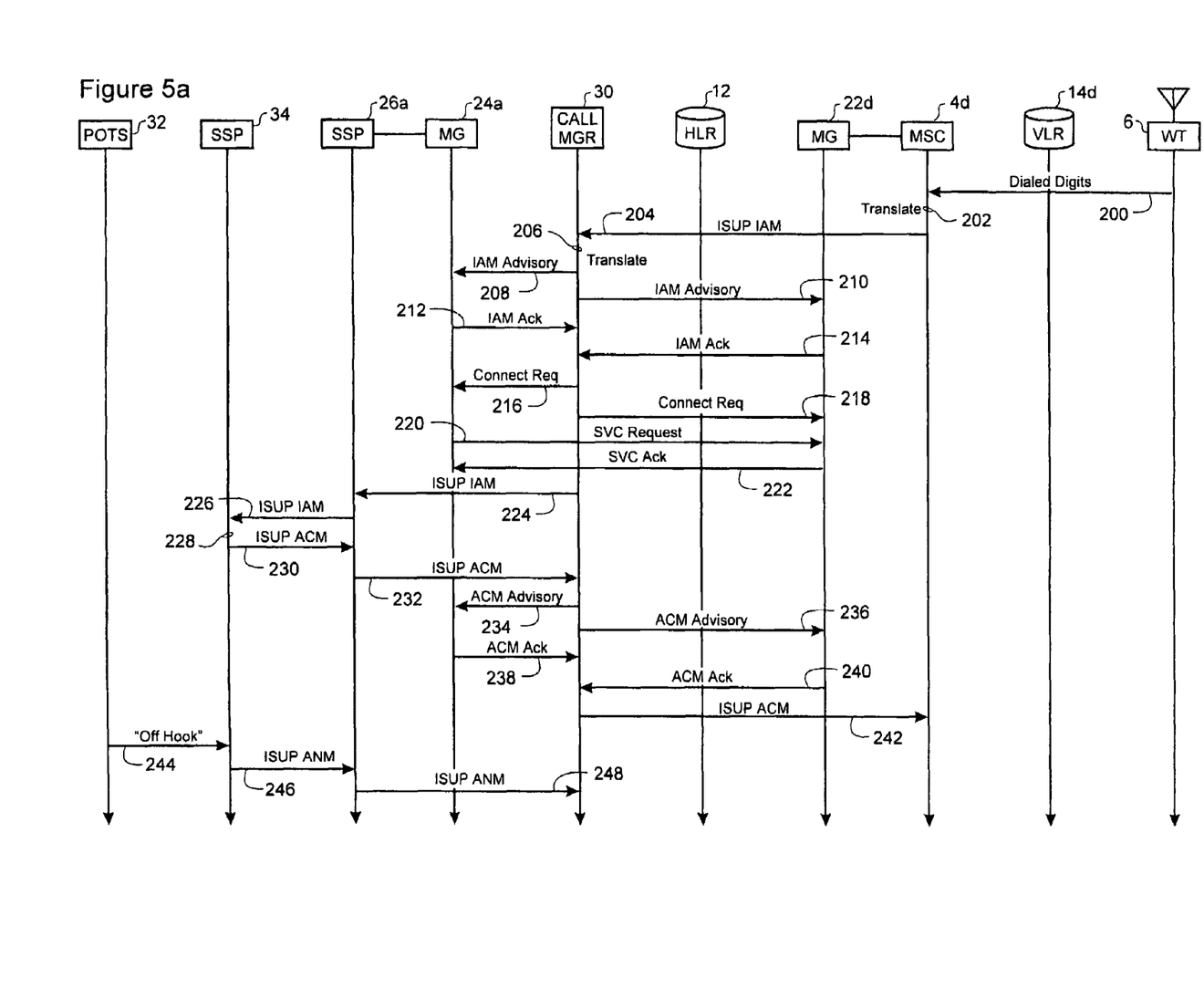
FIGS. 5a-b are message-flow diagrams schematically illustrating the principle messages exchanged between the components of the FIG. 3 for calls outbound from a wireless transceiver to the PSTN.
Figure 5B:
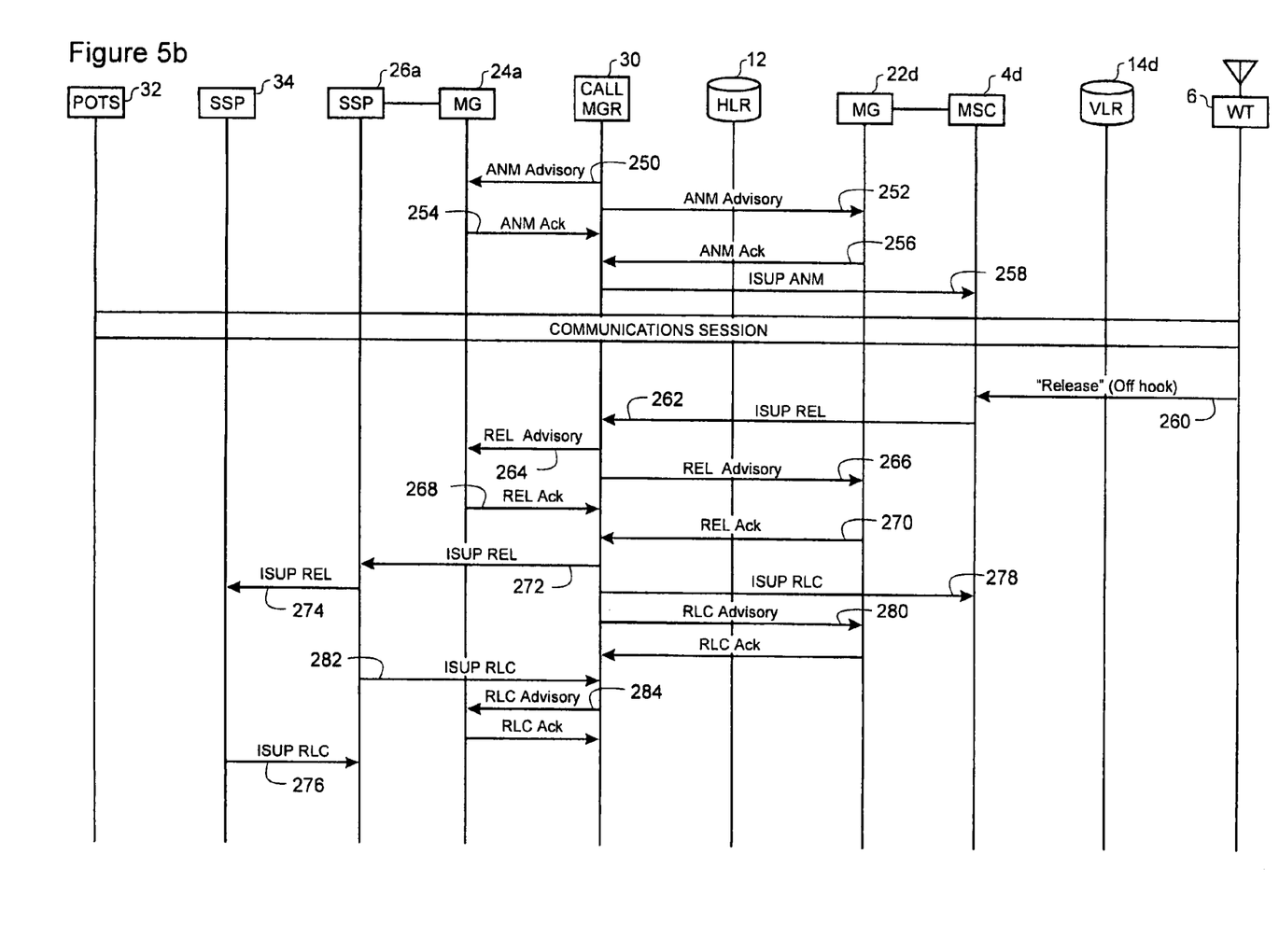

FIGS. 5a-b are schematic diagrams of the principal messages exchanged during the set-up and release of an outbound call connection from a wireless transceiver 6 to a telephone handset 32 connected to a caller-facing SSP 34 in the PSTN. In step 200, the wireless transceiver 6 is operated by the subscriber (not shown) to set up a wireless connection path with the MSC 4d and dial digits to initiate the call in a manner well known in the art. The dialed digits are transmitted over the wireless connection to the MSC 4d, again in a well known manner. On receipt of the dialed digits, the MSC 4d queries translation and routing tables (not shown) to determine how the call should be routed. The translation and routing tables may be local tables or may require a query to a Service Control Point (SCP). On translation (step 202), the MSC 4d determines that the call should be routed to a Point Code of the call manager 30.

The MSC 4d therefore formulates an ISUP IAM and forwards it in step 204 to the call manager 30. On receipt of the ISUP IAM, the call manager 30 translates the dialed number and determines which SSP is to serve as a gateway SSP 26a for the call, in step 206. The call manager 30 also determines the address (on the broadband packet network) of the MG 24a serving that gateway SSP 26a. Consequently, the call manager formulates an IAM Advisory message which it forwards via the broadband packet network to the MG 24a (step 208). An IAM Advisory message is also formulated and sent to MG 22d via the broadband packet network (step 210). On receipt of the IAM Advisory messages, MGs 24a,22d return IAM Acknowledge messages in steps 212, 214, respectively. On receipt of the IAM Acknowledge messages, the call manager 30 formulates connection request messages which are forwarded to the respective MGs 24a,22d in steps 216 and 218. The IAM Advisory message sent in step 208 to MG 24a contained the broadband packet network address of MG 22d. Consequently, MG 24a is enabled to set up a connection (a Switched Virtual Circuit (SVC), for example), backwards through the broadband packet network to the MG 22d serving the MSC 4d. This is initiated by sending a SVC request message in step 220. The MG 22d responds with a SVC Acknowledge message in step 222 indicating that the connection has been set up. Meanwhile, the call manager 30 formulates an ISUP IAM containing the dialed digits and forwards the ISUP IAM to the gateway SSP 26a in step 224. On receipt of the ISUP IAM, the gateway SSP 26a translates the dialed digits and formulates a further ISUP IAM message to the SSP 34 in step 226. On receipt of the ISUP IAM message, the SSP 34 extracts the dialed digits and tests the local loop which serves the telephone handset 32 to determine if the handset 32 is available (on-hook) (step 228). If so, the SSP 34 applies ringing to the local loop and returns an Address Complete (ACM) ISUP message. Otherwise, the SSP 34 returns an ISUP Release message to the outbound SSP 26a (which relays it to the call manager 30) to terminate the outbound call connection request. In this example, the local loop is determined to be available at step 228. Consequently, the SSP 34 returns an Address Complete (ACM) ISUP message in step 230 to the gateway SSP 26a. This ISUP ACM message is forwarded on to the call manager 30 in step 232. On receipt of the ISUP ACM, the call manager 30 sends respective ACM Advisory messages to the MGs 24a,22d in steps 234 and 236. These messages are acknowledged in steps 238 and 240. Meanwhile, the call manager 30 forwards the ACM message to the MSC 4d in step 242.

When the called telephone handset 32 is taken "off-hook", in step 244, the SSP 34 formulates an ISUP Answer (ANM) message which it returns to the gateway SSP 26a in step 246. The gateway SSP 26a forwards the ISUP ANM message to the call manager 30 in step 248. On receipt of the ANM message, the call manager 30 sends ANM Advisory messages to the respective MGs 24a,22d in steps 250, 252 and receives Acknowledgements in steps 254, 256. The call manager 30 then forwards the ANM message to MSC 4d in step 258. On receipt of the ANM message, the MSC 4d can start the billing record for the call.

After the subscriber and called party have completed the communications session, the subscriber ends the call in step 260 (FIG. 5b). On receiving the "end" signal, the MSC 4d releases the wireless connection with the wireless transceiver 6 and formulates an ISUP Release (REL) message which it forwards to the call manager 30 in step 262. On receipt of the REL message, the call manager 30 sends REL Advisory messages and receives REL Acknowledge messages to the respective MGs 24a,22d (steps 264-270). The call manager 30 then sends the REL message on to the gateway SSP 26a in step 272. The gateway SSP 26a passes the ISUP REL message to the SSP 34 (step 274) which disconnects the subscriber loop serving the called telephone handset 32. The SSP 34 then formulates an ISUP Release Complete (RLC) message which it sends in step 276 to the gateway SSP 26a. Meanwhile, the call manager 30 has sent an RLC message in step 278 to the MSC 4d and an RLC Advisory message in step 280 to the MG 22d. On receipt of the RLC message in step 282 from the gateway SSP 26a, the call manager sends an RLC Advisory message in step 284 which completes release of resources used in the outbound call connection.

As will be understood by those skilled in the art, calls made to wireless transceivers from wireless transceivers are handled in the same way as described above. Translation tables in the MSCs 4a-d route ISUP IAM messages to the call manager 30. The call manager 30 consults the HLR 12 to determine a current MSC serving the called wireless transceiver and sets up a call path through the broadband packet network 20 between the originating and current MSC. Wireless call completion is thereby facilitated and call routing significantly simplified, regardless of where the call terminates in the wireless or the wireline networks.

As will also be understood by those skilled in the art, although the invention has been described with reference to an Asynchronous Transfer Mode (ATM) broadband packet network, other broadband network protocols could also be used with success. For example, the invention may also be implemented using an Internet Protocol (IP) network, or a Multi-Protocol Label Switching (MPLS) network.

As will be further understood by those skilled in the art, although the invention has been explained with reference to a common channel signaling network used for call control messaging, many other types of signaling network can also be used with success. For example, the signaling network may be an X.25 network, an ATM, IP or MPLS network, or any other data packet network adapted to convey signaling messages between network nodes.

The embodiments of the invention described above are intended to be exemplary only. The scope of the invention is therefore intended to be limited solely by the scope of the appended claims.

I claim:

1. A call manager interconnecting a switched telephone network and a broadband packet network, the broadband packet network forte transfer of bearer traffic between a plurality of Mobile Switching Centers (MSCs) in a wireless network, the call manager comprising:
   at least one communication interface; and
   a control system associated with the at least one communication interface, the control system adapted to:
      receive a call request for routing a call from the switched telephone network to a selected wireless transceiver in the wireless network; and
      obtain information identifying an MSC currently serving the selected wireless transceiver from a location register adapted to store, in respect of each wireless transceiver in the wireless network, information identifying a one of the plurality of MSCs currently serving the wireless transceiver;
   wherein the information identifying the MSC currently sewing the selected wireless transceiver is transferred from the location register to the call manager without traversing an MSC.

2. The call manager of claim 1 wherein to obtain the information identifying the MSC currently sewing the selected wireless transceiver, the call manager queries the location register and the information identifying the MSC currently sewing the selected wireless transceiver is transferred from the location register to the call manager without traversing an MSC.

3. The call manager of claim 2 wherein the location register transfers the information identifying the MSC currently sewing the selected wireless transceiver to the call manager without traversing an MSC.

4. The call manager of claim 1 wherein the call manager enables a communications path between the MSC currently serving the selected wireless transceiver and a system interconnecting the switched telephone network and the broadband packet network without traversing an MSC other than the MSC currently serving the selected wireless transceiver.

5. The call manager of claim 1 wherein the call request is routed from The switched telephone network to the call manager without traversing an MSC.

6. The call manager of claim 1 wherein the call manager further operates to enable a communications path through the broadband packet network between a system interconnecting the switched telephone network and the broadband packet network and a media gateway interconnecting the broadband packet network and the MSC currently sewing the selected wireless transceiver.

7. The call manager of claim 1 wherein the broadband packet network is an Asynchronous Transfer Mode (ATM) network.

8. The call manager of claim 1 wherein The broadband packet network is an Internet Protocol (IP) network.

9. The call manager of claim 1 wherein the broadband packet network is a Multi-Protocol Label Switching (MPLS) network.

10. The call manager of claim 1 wherein the call manager is further adapted to obtain the information identifying the MSC currently serving the selected wireless transceiver from the location register using information identifying the selected wireless transceiver.

11. A system for enabling communications between a switched telephone network and a wireless network via a broadband packet network, the wireless network comprising a plurality of Mobile Switching Centers (MSCs) connected by media gateways to the broadband packet network, wherein the broadband packet network is used for the transfer of bearer traffic between the MSCs, the system comprising:
   an interconnecting mechanism interconnecting the switched telephone network and the broadband packet network for conveying bearer traffic between the switched telephone network and the broadband packet network, the interconnecting mechanism interconnecting the switched telephone network and the broadband packet network adapted to:
      receive a call request for routing a call from the switched telephone network to a selected wireless transceiver in the wireless network; and
      route the call request to a call manager that obtains information identifying an MSC currently serving the selected wireless transceiver from a location register adapted to store, in respect of each wireless transceiver in the wireless network, information identifying a one of the plurality of MSCs currently serving the wireless transceiver;
   wherein the information identifying the MSC currently serving the selected wireless transceiver is transferred from the location register to the call manager without traversing an MSC.

12. The system of claim 11 wherein to obtain the information identifying the MSC currently serving the selected wireless transceiver, the call manager queries the location register and the information identifying the MSC currently serving the selected wireless transceiver is transferred from the location register to the call manager without traversing an MSC.

13. The system of claim 12 wherein the location register transfers the information identifying the MSC currently serving the selected wireless transceiver to the call manager without traversing an MSC.

14. The system of claim 11 wherein the call manager enables a communications path between the MSC currently serving the selected wireless transceiver and without traversing an MSC other than the MSC currently serving the selected wireless transceiver.

15. The system of claim 11 wherein the call request is routed from the switched telephone network to the call manager without traversing an MSC.

16. The system of claim 11 wherein the interconnecting mechanism interconnecting the switched telephone network and the broadband packet network is further adapted to receive call set-up messages from the call manager, which operates to enable a communications path through the broadband packet network between the interconnecting mechanism and a media gateway interconnecting the broadband packet network and the MSC currently serving the selected wireless transceiver.

17. The system of claim 11 wherein the interconnecting mechanism comprises a Service Control Point (SSP) in the switched telephone network.

18. The system of claim 17 wherein the interconnecting mechanism further comprises a media gateway associated with the SSP and operating as a gateway between the switched telephone network and the broadband packet network.

19. The system of claim 11 wherein the interconnecting mechanism is further adapted to determine a point code of the call manager upon receiving the call request and to route the call request to the point code of the call manager.

20. The system of claim 11 further comprising the call manager.

21. The system of claim 20 wherein the call manager is further adapted to determine an address of the media gateway interconnecting the broadband packet network and the MSC currently serving the selected wireless transceiver.

22. The system of claim 21 wherein the call manager is further adapted to provide call set-up messages to the interconnecting mechanism and to provide call set-up messages to the media gateway interconnecting the broadband packet network and the MSC currently serving the selected wireless transceiver to enable a communications path through the broadband packet network between the interconnecting mechanism and the media gateway interconnecting the broadband packet network and the MSC.

23. The system of claim 22 wherein the interconnecting mechanism is further adapted to reeeive a connection request message from the media gateway interconnecting the broadband packet network and the MSC currently serving the selected wireless transceiver.

24. The system of claim 23 wherein the connection request messages is a Switched Virtual Circuit (SVC) request.

25. The system of claim 20 wherein the call manager is adapted to obtain the information identifying the MSC currently serving the selected wireless transceiver from the location register via at least one of the group of networks consisting of the broadband packet network and a Common Channel Signaling (CCS) network.

26. The system of claim 20 further comprising the location register and wherein the location register is a consolidated Home Location Register (HLR) containing information identifying an MSC currently serving each wireless transceiver served by the wireless network.

27. The system of claim 26 wherein the location register is co-resident with the call manager.

28. The system of claim 26 wherein the location register is remote from the call manager.

29. The system of claim 20 further comprising the location register and wherein the location register is a plurality of Home Location Registers (HLRs), each HLR being associated with one or more MSCs and containing information related to predetermined ones of the wireless transceivers.

30. The system of claim 29 wherein the call manager is further adapted to:
 a) select one of the plurality of HLRs; and
 b) obtain the information identifying the MSC currently serving the selected wireless transceiver from the selected HLR via at least one of the group of networks consisting of the broadband packet network and a Common Channel Signaling (CCS) network.

31. The system of claim 30 wherein selection of the HLR is based on a received destination address identifying the selected wireless transceiver.

32. The system of claim 11 wherein the broadband packet network is an Asynchronous Transfer Mode (ATM) network.

33. The system of claim 11 wherein the broadband packet network is an Internet Protocol (IP) network.

34. The system of claim 11 wherein the broadband packet network is a Multi-Protocol Label Switching (MPLS) network.

35. The system of claim 22 wherein the call setup messages are Integrated Services Digital Network User Part (ISUP) messages that include information to identify the selected wireless transceiver.

36. The system of claim 35 wherein the call manager is adapted to obtain the information identifying the MSC currently serving the selected wireless transceiver from the location register using the information identifying the selected wireless transceiver.

37. A method of enabling communications between a switched telephone network and a wireless network via a broadband packet network, the wireless network comprising a plurality of Mobile Switching Centers (MSCs) connected by media gateways to the broadband packet network, the broadband packet network used for the transfer of bearer traffic between the MSCs, the method comprising the steps of:
 receiving a call request for routing a call from the switched telephone network to a selected wireless transceiver in the wireless network;
 obtaining information identifying an MSC currently serving the selected wireless transceiver from a location register adapted to store, in respect of each wireless transceiver in the wireless network, information identifying a one of the plurality of MSCs controlling communications with the wireless transceiver; and
 wherein the information identifying the MSC currently serving the selected wireless transceiver is transferred from the location register to the call manager without traversing an MSC.

38. The method of claim 37 wherein obtaining the information identifying the MSC currently serving the selected wireless transceiver comprises querying the location register and transferring the information identifying the MSC currently serving the selected wireless transceiver from the location register to the call manager without traversing an MSC.

39. The method of claim 38 wherein obtaining the information identifying the MSC currently serving the selected wireless transceiver further comprises transferring the information identifying the MSC currently serving the selected wireless transceiver from the location register to the call manager without traversing an MSC.

40. The method of claim 37 further comprising enabling a communications pat between the MSC currently serving the selected wireless transceiver and a system interconnecting the switched telephone network and the broadband packet network without traversing an MSC other than the MSC currently serving the selected wireless transceiver.

41. The method of claim 40 wherein enabling the communications path comprises providing call set-up messages to the system interconnecting the switched telephone network and the broadband packet network to enable the communications path through the broadband packet network between the system interconnecting the switched telephone network and the broadband packet network and a media gateway interconnecting the broadband packet network and the MSC currently serving the selected wireless transceiver.

42. The method of claim 41 wherein enabling the communications path further comprises providing a connection request message to the system from the media gateway interconnecting the broadband packet network to the MSC currently serving the selected wireless transceiver, wherein the media gateway interconnecting the broadband packet network to the MSC provides the connection request message in response to set-up messages including a network address of the system.

43. A system comprising:
 an interconnecting mechanism interconnecting a switched telephone network and a broadband packet network;
 a plurality of Mobile Switching Centers (MSCs) coupled to the broadband packet network by a plurality of media gateways, each of the plurality of MSCs adapted to control communications with respective ones of a plurality of wireless transceivers within a corresponding service area;

a location register adapted to store, in respect of each wireless transceiver, information identifying a one of the plurality of MSCs currently serving the wireless transceiver; and a call manager adapted to obtain information identifying an MSC currently serving a selected wireless transceiver from the location register upon receiving a call request from the interconnecting mechanism for routing a call from the switched telephone network to the selected wireless transceiver, the information transferred from the location register to the call manager without traversing an MSC.

44. The system of claim 43 wherein to obtain the information identifying the MSC currently serving the selected wireless transceiver, the call manager queries the location register and the information identifying the MSC currently serving the selected wireless transceiver is transferred from the location register to the call manager without traversing an MSC.

45. The system of claim 44 wherein the location register transfers the information identifying the MSC currently serving the selected wireless transceiver to the call manager without traversing an MSC.

46. The system of claim 43 wherein the call request is routed from the switched telephone network to the call manager without traversing an MSC.

47. The system of claim 43 wherein each of the plurality of wireless transceivers is capable of being served by any one of the plurality of MSCs when in the corresponding service area.

48. The system of claim 43 wherein the call manager is further adapted tci obtain the information from the location register via a Common Channel Signaling (CCS) network that routes signaling information between the switched telephone network and the call manager without traversing an MSC.

49. The system of claim 43 wherein the call manager is further adapted to obtain the information from the location register via the broadband packet network.

50. The system of claim 43 wherein the interconnecting mechanism is further adapted to:
  receive the call request for routing the call from the switched telephone network to the selected wireless transceiver;
  route the call request to the call manager; and
  receive call set-up messages from the call manager, which enables a communication path through the broadband packet network between the interconnecting mechanism and a one of the plurality of media gateways interconnecting the broadband packet network and the MSC currently serving the selected wireless transceiver.

51. The system of claim 43 wherein the call manager is further adapted to enable a communications path through the broadband packet network between the interconnecting mechanism and a one of the plurality of media broadband packet network and the MSC currently serving the selected wireless transceiver.

52. The system of claim 43 wherein the call manager is further adapted to enable the communications path without traversing an MSC other than the MSC currently serving the selected wireless transceiver.

53. A system for enabling communications between a switched telephone network and a wireless network via a broadband packet network, the wireless network comprising a plurality of Mobile Switching Centers (MSCs) connected by media gateways to the broadband packet network, the broadband packet network used for the transfer of bearer traffic between the MSCs, the system comprising:

means for interconnecting the switched telephone network and the broadband packet network forte transfer of bearer traffic and comprising:
  means for receiving a call request for routing a call from the switched telephone network to a selected wireless transceiver in the wireless network; and
  means for routing the call request from the means for receiving the call request to a call manager that obtains information identifying an MSC currently serving the selected wireless transceiver from a location register adapted to store, in respect of each wireless transceiver in the wireless network, information identifying a one of the plurality of MSCs currently serving communications with the wireless transceiver; wherein the information identifying the MSC currently serving the selected wireless transceiver is transferred from the location register to the call manager without traversing an MSC.

54. The system of claim 53 wherein to obtain the information identifying the MSC currently serving the selected wireless transceiver, the call manager queries the location register and the information identifying the MSC currently serving the selected wireless transceiver is transferred from the location register to the call manager without traversing an MSC.

55. The system of claim 54 wherein the location register transfers the information identifying the MSC currently serving the selected wireless transceiver to the call manager without traversing an MSC.

56. The system of claim 53 wherein the call manager enables a communications path between the MSC currently serving the selected wireless transceiver and the means for interconnecting the switched telephone network and the broadband packet network without traversing an MSC other than the MSC currently serving the selected wireless transceiver.

57. The system of claim 53 wherein the call request is routed from the switched telephone network to the call manager without traversing an MSC.

58. The system of claim 53 wherein the means for routing the call request to the call manager comprises means for determining a point code of the call manager upon receiving the call request and means for routing the call request to the point code of the call manager.

59. The system of claim 58 wherein the means for determining the point code of the call manager comprising means for querying routing and translation tables.

60. The system of claim 53 wherein the means for interconnecting the switched telephone network and the broadband packet network further comprises a means for receiving call set-up messages from the call manager, which provides the call set-up messages to enable a communications path through the broadband packet network between the means for interconnecting the switched telephone network and the broadband packet network and a media gateway interconnecting the broadband packet network and the MSC currently serving the selected wireless transceiver.

61. The system of claim 60 wherein the means for interconnecting the switched telephone network and the broadband packet network further comprises a means for receiving a connection request message from the media gateway interconnecting the broadband packet network to the MSC currently serving the selected wireless transceiver wherein the media gateway interconnecting the broadband packet network to the MSC provides the connection request message in response to set-up messages including a network address of the means for interconnecting the switched telephone network and the broadband packet network from the call manager.

62. A system for enabling communications between a switched telephone network and a wireless network via a broadband packet network, the wireless network comprising a plurality of Mobile Switching Centers (MSCs) connected by media gateways to the broadband packet network, wherein the broadband packet network is used for the transfer of bearer traffic, the system comprising:
  a call manager adapted to receive a call request for routing a call from the switched telephone network to a selected wireless transceiver in the wireless network; and
  a location register adapted to store, in respect of each wireless transceiver in the wireless network, information identifying a one of the plurality of MSCs currently serving the wireless transceiver;
  wherein the call manager and the location register cooperate such that the information identifying an MSC currently serving the selected wireless transceiver is transferred from the location register to the call manager without traversing an MSC.

63. The system of claim 62 wherein to obtain the information identifying the MSC currently serving the selected wireless transceiver, the call manager queries the location register and the information identifying the MSC currently serving the selected wireless transceiver is transferred from the location register to the call manager without traversing an MSC.

64. The system of claim 63 wherein the location register transfers the information identifying the MSC currently serving the selected wireless transceiver to the call manager in response to the query from the call manager without traversing an MSC.

65. The system of claim 62 wherein the call request is routed from the switched telephone network to the call manager without traversing an MSC.

66. The system of claim 62 further comprising an interconnecting mechanism for interconnecting the switched telephone network and the broadband packet network for conveying bearer traffic between the switched telephone network and the broadband packet network, the interconnecting mechanism adapted to:
  receive the call request for routing the call from the switched telephone network to the selected wireless transceiver in the wireless network; and
  route the call request to the call manager.

67. The system of claim 66 wherein the call manager is further adapted to enable a communications path between the MSC currently serving the selected wireless transceiver and the interconnecting mechanism without traversing an MSC other than the MSC currently serving the selected wireless transceiver.

68. The system of claim 66 wherein the interconnecting mechanism is further adapted to receive call set-up messages from the call manager, and the call manager is further adapted to provide the set-up messages to enable a communications path through the broadband packet network between the interconnecting mechanism and a media gateway interconnecting the broadband packet network and the MSC currently serving the selected wireless transceiver.

69. The system of claim 66 wherein the interconnecting mechanism comprises a Service Control Point (SSP) in the switched telephone network.

70. The system of claim 69 wherein the interconnecting mechanism further comprises a media gateway associated with the SSP and operating as a gateway between the switched telephone network and the broadband packet network.

71. The system of claim 66 wherein the interconnecting mechanism is fUrther adapted to determine a point code of the call manager upon receiving the call request and to route the call request to the point code of the call manager.

72. The system of claim 66 wherein the call manager is further adapted to determine an address of a media gateway interconnecting the broadband packet network and the MSC currently serving the selected wireless transceiver.

73. The system of claim 72 wherein the call manager is further adapted to provide call set-up messages to the interconnecting mechanism and to provide call set-up messages to the media gateway interconnecting the broadband packet network and the MSC currently serving the selected wireless transceiver to enable the communications path through the broadband packet network between the interconnecting mechanism and the media gateway interconnecting the broadband packet network and the MSC.

74. The system of claim 73 wherein the interconnecting mechanism is further adapted to receive a connection request message from the media gateway interconnecting the broadband packet network and the MSC currently serving the selected wireless transceiver.

75. The system of claim 74 wherein the connection request message is a Switched Virtual Circuit (SVC) request.

76. The system of claim 62 wherein the call manager is adapted to obtain the information identifying the MSC currently serving the selected wireless transceiver from the location register via at least one of the group of networks consisting of the broadband packet network and a Common Channel Signaling (CCS) network.

77. The system of claim 62 wherein the location register is a consolidated Home Location Register (HLR) containing information identifying the MSC currently serving each wireless transceiver served by the wireless network.

78. The system of claim 77 wherein the location register is co-resident with the call manager.

79. The system of claim 77 wherein the location register is remote from the call manager.

80. The system of claim 62 wherein the location register is a plurality of Home Location Registers (HLRs), each HLR being associated with one or more MSCs and containing information related to predetermined ones of the wireless transceivers.

81. The system of claim 80 wherein the call manager is further adapted to:
  a) select one of the plurality of HLRs; and
  b) obtain the information identifying the MSC currently serving the selected wireless transceiver from the selected HLR via at least one of the group of networks consisting of the broadband packet network and a Connon Channel Signaling (CCS) network without traversing an MSC.

82. The system of claim 81 wherein selection of the HLR is based on a received destination address identifying the selected wireless transceiver.

83. The system of claim 62 wherein the broadband packet network is an Asynchronous Transfer Mode (ATM) network.

84. The system of claim 62 wherein the broadband packet network is an Internet Protocol (IP) network.

85. The system of claim 62 wherein the broadband packet network is a Multi-Protocol Label Switching (MPLS) network.

86. The system of claim 62 wherein the call manager is adapted to obtain the information identifying the MSC currently serving the selected wireless transceiver from the location register using information identifying the selected wireless transceiver.

87. The system of claim 62 wherein the system is further adapted to enable communications between a first wireless transceiver in the wireless network and a second wireless transceiver in the wireless network.

88. The system of claim 87 wherein the call manager is further adapted to receive a call request from an originating MSC for routing a call from the first wireless transceiver currently served by the originating MSC to the second wireless transceiver, wherein the call manager and the location register cooperate such that the information identifying an MSC currently serving the second wireless transceiver is transferred from the location register to the call manager without traversing an MSC.

89. The system of claim 88 wherein the call manager queries the location register to obtain the information identifying the MSC currently serving the second wireless transceiver without traversing an MSC.

90. The system of claim 89 wherein the location register transfers the information identifying the MSC currently serving the second wireless transceiver to the call manager without traversing an MSC in response to the query from the call manager.

91. The system of claim 88 wherein the originating MSC receives the call request from the first wireless transceiver and routes the call request to the call manager.

92. The system of claim 62 further comprising a plurality of interconnecting mechanisms for interconnecting the switched telephone network and the broadband packet network for conveying bearer traffic between the switched telephone network and the broadband packet network.

93. The system of claim 92 wherein for a call originating in the wireless network and terminating in the switched telephone network, the call manager is further adapted to:
  receive a call request from an originating MSC for routing a call from a originating wireless transceiver currently served by the originating MSC and destination address in the switched telephone network;
  enable a communications path between a media gateway interconnecting the originating MSC and the broadband packet network and a select one of the interconnecting mechanisms; and
  enable a connection between the select one of the interconnecting mechanisms and the destination address through the switched telephone network.

94. The system of clalm 93 wherein the call manager is further adapted to select the select one of the interconnecting mechanisms based on a geographical proximity between the select one of the interconnecting mechanisms and the destination address.

95. A system for enabling communications between wireless transceivers in a wireless network via a broadband packet network, the wireless network comprising a plurality of Mobile Switching Centers (MSCs) connected by media gateways to the broadband packet network, wherein the broadband packet network is used for the transfer of bearer traffic, the system comprising:
  a call manager adapted to receive a call request from an originating MSC for routing a call from a first wireless transceiver currently served by the originating MSC to a second wireless transceiver in the wireless network; and
  a location register adapted to store, in respect of each wireless transceiver in the wireless network, information identifying a one of the plurality of MSCs currently serving the wireless transceiver;
  wherein the call manager and the location register cooperate such tat information identifying an MSC currently serving the second wireless transceiver is transferred from the location register to the call manager without traversing an MSC.

96. The system of claim 95 wherein the call manager queries the location register to obtain the information identifying the MSC currently serving the second wireless transceiver without traversing an MSC.

97. The system of claim 96 wherein the location register transfers the information identifying the MSC currently serving the second wireless transceiver to the call manager without traversing an MSC in response to the query from the call manager.

98. The system of claim 95 wherein the originating MSC receives the call request from the first wireless transceiver and routes the call request to the call manager.

99. The system of claim 98 wherein the originating MSC is further adapted to determine a point code of the call manager upon receiving the call request from the first wireless transceiver and to route the call request to the point code of the call manager.

100. The system of claim 95 wherein the call manager is further adapted to enable a communications path between the MSC currently serving the second wireless transceiver and the originating MSC.

101. The system of claim 95 wherein the call manager is further adapted to provide call set-up messages to enable a communications path through the broadband packet network between a first media gateway interconnecting the broadband packet network and the originating MSC and a second media gateway interconnecting the broadband packet network and the MSC currently serving the second wireless transceiver.

102. The system of claim 101 wherein the originating MSC is further adapted to receive a connection request message from the media gateway interconnecting the broadband packet network and the MSC currently serving the second wireless transceiver.

103. The system of claim 102 wherein the connection request messages is a Switched Virtual Circuit (SVC) request.

104. The system of claim 95 wherein the call manager is further adapted to obtain the information identifying the MSC currently serving the second wireless transceiver from the location register via at least one of the group of networks consisting of the broadband packet network and a Common Channel Signaling (CCS) network.

105. The system of claim 95 wherein the location register is a consolidated Home Location Register (HLR) containing information identifying the MSC currently serving each wireless transceiver served by the wireless network.

106. The system of claim 105 wherein the location register is co-resident with the call manager.

107. The system of claim 105 wherein the location register is remote from the call manager.

108. The system of claim 95 wherein the location register is a plurality of Home Location Registers (HLRs), each FILR being associated with one or more MSCs and containing information related to predetermined ones of the wireless transceivers in the wireless network.

109. The system of claim 108 wherein the call manager is further adapted to:
  a) select one of the plurality of HLRs; and
  b) obtain the information identifying the MSC currently serving the second wireless transceiver from the selected HLR via at least one of the group of networks consisting of the broadband packet network and a Common Channel Signaling (CCS) network without traversing an MSC.

110. The system of claim 109 wherein selection of the HLR is based on a received destination address identifying the second wireless transceiver.

111. The system of claim 95 wherein the broadband packet network is an Asynchronous Transfer Mode (ATM) network.

112. The system of claim 95 wherein the broadband packet network is an Internet Protocol (IP) network.

113. The system of claim 95 wherein the broadband packet network is a Multi-Protocol Label Switching (MPLS) network.

114. A method for enabling communications between a switched telephone network and a wireless network via a broadband packet network, the wireless network comprising a plurality of Mobile Switching Centers (MSCs), coupled to the broadband packet network, the method comprising:
  receiving a call request for routing a call from the switched telephone network to a select wireless transceiver in the wireless network; and
  establishing a communications path for transfer of bearer traffic associated with the call between an interconnecting mechanism interconnecting the switched telephone network and the broadband packet network and an MSC currently serving the select wireless transceiver over the broadband packet network without traversing an MSC other than the MSC currently serving the select wireless transceiver regardless of which of the plurality of MSCs is the MSC currently serving the select wireless transceiver.

115. The method of claim 114 wherein the step of establishing the communications path comprises establishing a communications path between the interconnecting mechanism and a media gateway interconnecting the MSC currently serving the select wireless transceiver and the broadband packet network.

116. The method of claim 114 wherein the step of receiving the call request comprises:
  receiving the call request at the interconnecting mechanism;
  routing the call request to a call manager; and
  obtaining information identifying the MSC currently serving the selected wireless transceiver.

117. The method of claim 116 wherein the step of obtaining the information comprises cooperating with a location register adapted to store, in respect of each wireless transceiver in the wireless network, information identifying a one of the plurality of MSCs currently serving the wireless transceiver to obtain the information identifying the MSC currently serving the select wireless transceiver.

118. The method of claim 117 wherein the information is transferred from the location register to the call manager without traversing an MSC.

119. The method of claim 114 wherein the select wireless transceiver is a roaming wireless transceiver and the MSC currently serving the select wireless transceiver is an MSC other than a home MSC of the select wireless transceiver.

120. A call manager for enabling communications between a switched telephone network and a wireless network via a broadband packet network, the wireless network comprising a plurality of Mobile Switching Centers (MSCs) coupled to the broadband packet network, the call manager comnrising:
  at least one communication interface: and
  a control system associated with the at least one communication interface, the control system adapted to:
  receive a call request for routing a call from the switched telephone network to a select wireless transceiver in the wireless network; and
  establish a communications path for transfer of bearer traffic associated with the call between an interconnecting mechanism interconnecting the switched telephone network and the broadband packet network and an MSC currently serving the select wireless transceiver over the broadband packet network without traversing an MSC other than the MSC currently serving the select wireless transceiver regardless of which of the plurality of MSCs is the MSC currently serving the select wireless transceiver.

121. The call manager of claim 120 wherein the MSC currently serving the select wireless transceiver is connected to the broadband packet network by a media gateway and the call manager is adapted to establish the communications path between the system interconnecting the switched telephone network and the broadband packct network interconnecting mechanism and the media gateway.

122. The call manager of claim 120 wherein the call manager is further adapted to obtain information identifying the MSC currently serving the selected wireless transceiver from a location register adapted to store, in respect of each wireless transceiver in the wireless network, information identifying a one of the plurality of MSCs currently serving the wireless transceiver.

123. The call manager of claim 122 wherein the call manager is further adapted to cooperate with the location register to obtain the information, wherein the information is transferred from the location to the call manager without traversing an MSC.

124. The call manager of claim 120 wherein the select wireless transceiver is a roaming wireless transceiver and the MSC currently serving the select wireless transceiver is an MSC other than a home MSC of the select wireless transceiver.

* * * * *